July 12, 1927.
M. E. LAYNE
1,635,368
GUARDED OPENING SCREEN
Filed March 7, 1927
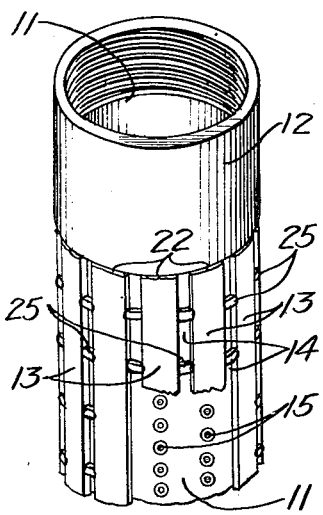
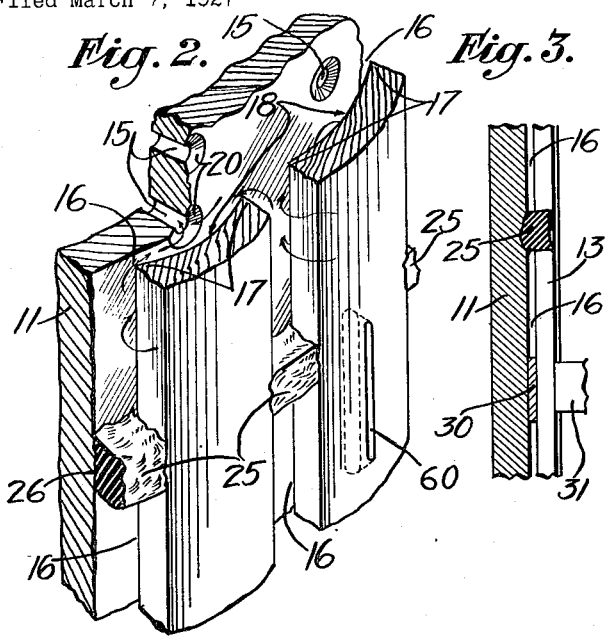
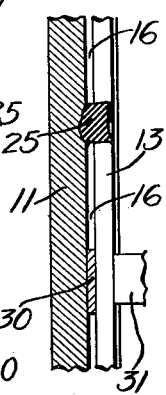
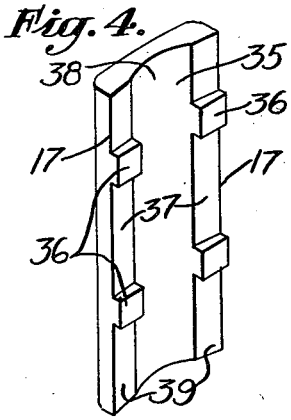
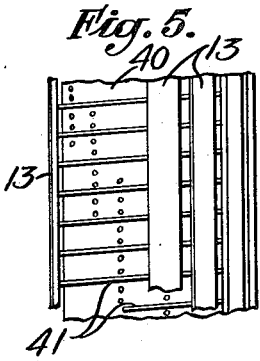
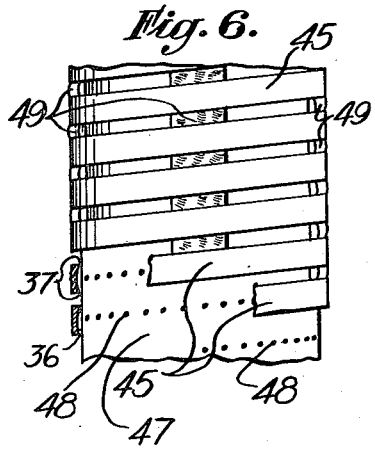
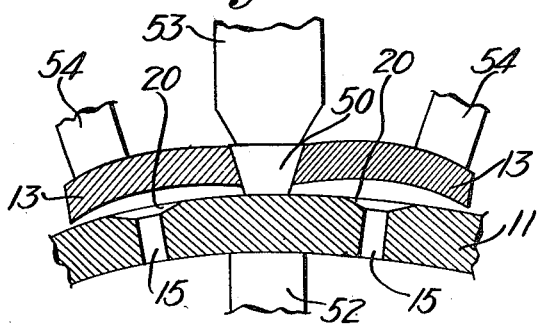
INVENTOR:
MAHLON E. LAYNE
BY
*Jesse P. Wham*
ATTORNEY.

Patented July 12, 1927.

1,635,368

UNITED STATES PATENT OFFICE.

MAHLON E. LAYNE, OF SOUTH PASADENA, CALIFORNIA, ASSIGNOR TO LAYNE & BOWLER CORPORATION, OF LOS ANGELES, CALIFORNIA, A CORPORATION OF CALIFORNIA.

GUARDED OPENING SCREEN.

Application filed March 7, 1927. Serial No. 173,403.

This invention relates to well screen or separator of the character used in oil wells, gas wells and water wells for the purpose of holding back the earth formations, which may be sand, gravel and other substances, but having the utility of permitting the entry of fluid into the screen or separator without the earth materials previously mentioned; and the invention relates particularly to a screen having its greatest utility in deep oil wells where severe working conditions are to be met.

It is an object of the invention to provide a well screen having a large capacity for separation of the earth liquids from the solids and which is adapted to perform a very efficient separation of these materials, the screen being so constructed that it will have maximum physical strength to resist the unusual strains to be encountered in deep wells, and having maximum resistance against abrasion by the finely divided earth materials carried in the liquids, principally as a result of the reduced entry speed of the liquid which the new screen accomplishes.

It is an object of the invention to provide a screen employing a tubular member or pipe having perforations therein through which the liquids gain access to the interior of the pipe, and having guard strips so arranged and secured over these openings that the liquid on the outside of the screen must flow under the edges of the guard strips to reach the inlet openings, it being an especial feature of the invention to space the strips from the face of the pipe so that the screen slots are between the edges of the strips and the face of the pipe instead of between the outer edges of adjacent strips as previously practised.

It is an object of the invention to weld between the guard strips at evenly spaced intervals, these welds also fusing with the main body of the screen pipe in a manner to join the strips and the screen pipe securely and firmly in working position, and to increase the strength of the screen structure. The welds, when the strips are employed upon the pipe in longitudinal direction, serve as supporting shelves spaced at such intervals that the gravel or large materials forming the earth wall surrounding the screen will be held up thereby, and in this manner prevented from settling and packing tightly toward the bottom of the well with the resulting tendency to cut off the access of liquids to the screen.

It is an object of the invention to provide a guard strip especially adapted for use in centralized relation over the openings in the screen pipe which forms the core of the screen structure.

A further object of the invention contemplates a novel method whereby the guard strips may be placed and secured upon the screen pipe without the use of permanent spacing members acting between the strips and the pipe, this being accomplished by holding the guard strips away from the pipe during the welding, the welds when formed serving to hold the guard strips and pipe in spaced relationship.

The difference between the invention and the previous common practise is that the gage of the ordinary screen, such as wire wound, is accomplished by spacing the wire or screen members away from each other, whereas my screen openings are formed by spacing the screening member the desired distance from the face of the perforated pipe or supporting frame, without regard to distance between the individual screening members. A second and important difference is that the openings of the screen in the first instance are brought in direct contact with the wall of the well, whereas my screen openings are spaced from the wall of the well, greatly reducing choking and clogging conditions at entry point. Among the valuable results obtained by the invention are: The screen member is strengthened and the screening opening is increased over the area obtainable in screen formed of pipe having gas cut, perforated or milled slot screening openings.

Further objects and advantages will be made evident throughout the following part of the specification and the accompanying drawings, in which:

Fig. 1 is a perspective elevation of a well screen embodying the essentials of my invention.

Fig. 2 is an enlarged fragmentary view partly in section illustrating the novel features attained by my invention.

Fig. 3 is a fragmentary view illustrating the manner in which screen strips of the character shown in the preceding figures are properly secured in spaced relationship on the screen pipe.

Fig. 4 is a perspective view showing an alternative form of guard strip having spacing lugs formed thereon.

Fig. 5 is a fragmentary elevation showing how other spacing means may be employed in the practise of the invention.

Fig. 6 shows the guard strips placed upon the pipe spirally in centralized position over the drilled screen openings which are also placed in spiral arrangement.

Fig. 7 is a fragmentary section showing an alternative method of welding the guard strips on the screen pipe.

Fig. 1 shows a tubular member or pipe 11 of the character ordinarily used in well operations, this pipe having coupling means 12 shown in the form of a standard coupling. On this pipe are secured longitudinal guard strips 13, which are preferably evenly spaced around the circumference of the pipe with spaces 14 between their adjacent edges, and are welded at 22 to the coupling 12. Under each of the strips 13 is a row of suitably spaced drill holes forming screen openings 15, the guard strips being centralized over the openings serve as a protection, and these guard strips being spaced away from the surface of the pipe as indicated in Figs. 2 and 3, provide narrow screen slots 16 between the surface of the pipe and the edges 17 of the strips 13, through which slots liquids contained in the earth structure gain access to the openings 15 and pass through into the interior of the pipe 11.

A feature of the invention is to provide under each of the guard strips an inwardly enlarging passage, which forms a longitudinal channel of large capacity between the pipe 11 and each guard strip 13. This construction may be accomplished by curving the guard strips 13 across their width so that they will be concave at 18 on their undersides, this curvature being generated on a shorter radius than the circumference of the pipe 11, thereby causing the space between the pipe and the guard strips to enlarge as it progresses inwardly from the edges 17 toward the center of the strip. The holes 15 are computed in area slightly larger than the area of the slots 16 and the outer ends of these holes 15 may be beveled off as indicated at 20 for the purpose of enlarging the path through which the liquid flows as it approaches an opening 15, although this is not essential to the practise of the invention. At the ends of the strips 13, in the manner shown in Fig. 1, the collar 12 is screwed on the pipe 11, and welded at 22 to the end of these strips 13. At intervals throughout the length of the pipe and the strips 13, inter-connecting welds 25 are made between the adjacent edges of the strips, this weld also being fused with or built onto the pipe 11 as shown at 26 in Fig. 2 so as to firmly tie the strips together in a circular arrangement and to firmly tie them to the screen pipe, thus joining the pipe and guard strips in a rigid structure and serving to reinforce the pipe circumferentially, and enabling the strips 13 to reinforce the pipe longitudinally in such a manner that the tensional strength of the screen structure will be greater than that of the pipe. By welding the ends of the strips to the couplings 12, the strength of a string of screen is maintained substantially constant throughout its entire length, whereas, were the strips 13 not welded to the couplings, a weak point would exist where the pipe enters the coupling. In manufacture one coupling is placed on each length of screen and the adjacent ends of the strips are welded thereto, the other ends of the screen strips are welded to their adjacent couplings when the string of screen is made up.

In one form in which the invention may be practised the strips 13 are described as being spaced away from the pipe 11 so as to form slots 16 between the pipe and the edges 17 of the guard strips. This is accomplished by my process which employs a spacing member such as indicated at 30 and a clamping member such as is indicated at 31, the spacer being situated between the strips 13 and the surface of the pipe 11 and the strip held thereagainst by the clamp 31 during the making of a weld 25 adjacent to the spacing means. The spacing means is moved along the pipe slightly ahead of the welding operation, thereby properly holding the guard strips in correct position relative to the pipe 11 previous to the making of the welds which thereafter form the spacing means and tying means previously mentioned herein.

Especially where the screen strip is placed spirally on the drilled pipe, but also in the longitudinal form, I have found it desirable to use a guard strip 35 having spacing lugs 36 formed on the underface thereof and along the edges 17. The spaces 37 then existing between the lugs 36, serving in conjunction with the pipe on which the strip 35 is mounted to form the slots through which the liquids pass under the guard strip in seeking entry to the screen pipe through the centralized drilled holes. It will be noticed that this strip 35 is of concave form at 38 and 39 on its underface for the purpose of forming the previously mentioned longitudinal channels between guard strips and the screen pipe.

Other methods of holding the strips 13 spaced away from the screen pipe may be used. The pipe 40 of Fig. 5 is an illustration of an instance where a helix of wire 41 is wound upon the pipe 40 and the strips 13 placed longitudinally thereover and welded in the manner previously described.

The invention is not confined to longitudinal placement of the screen strips, but as shown in Fig. 6 the screen strip 45, which is preferably of the form shown in Fig. 4, may be wound in a spiral on a pipe 47 and centralized over a spiral row of openings 48, there being welds 49 longitudinally aligned between the separate turns or spirals of the strip 45 so as to tie them together and to the pipe 47. A screen manufactured in this manner follows the essentials of the invention and gives a structure having very marked resistance against collapsation, and increased facility for resisting the downward movement of the material from which the liquid is being separated.

In Fig. 7 I show a portion of a screen pipe 11 and a pair of guard strips 13 spaced thereabove. This view shows a manner of securing the guard strips and the pipe 11 together by means of metal lugs 50, which are spot welded under the action of inner and outer electrodes 52 and 53 and the auxiliary electrodes 54, to the surface of the pipe 11 and the edges of the strips 13. This lug 50 is in the form of a small block of metal and is forced inwardly between the edges of the strips 13 by the electrodes 53 during the time an electric potential is introduced between the electrode 53 and the auxiliary electrodes 54. This flow of current between the lug 50 and the strips 13 causes fluidification of the abutting surfaces to occur, at which time current is introduced between the electrodes 52 and 53 to cause welding of the lugs 50 onto the pipe 11.

Particular features of the invention reside in the structure which prevents entry of the well fluid directly into the openings in the pipe, but cause it to flow in a direction along or parallel to the surface of the pipe, in the provision of guard strips having their under portions hollowed so as to form longitudinal channels relative to the guard strips, and the use of small drilled openings which are centralized under the strips. The entering fluid as it approaches the surface of the screen pipe changes its course from a radial direction to a circumferential direction. As a result of this, and also resulting from the very large area of screening opening provided by my invention, a very low velocity of the fluid is attained, which condition is conducive to more perfect separation. The entire screen member is substantially the same diameter as the coupling, which contributes to ease of lowering into or pulling from the hole.

Longitudinal openings 60 such as shown in Fig. 2, may be used in the strips 13, or the strips 35, for the purpose of increasing the screening capacity of the product. These openings 60, being longitudinal in direction, do not materially detract from the tensile strength of the strips but do measurably increase the capacity of the screen. For the purpose of giving additional wearing qualities, my screen is so constructed that it is possible to employ screen forming members of hardened metal or from material having better wear resisting qualities than the steel from which pipe is ordinarily made. The corners at the edges 17 of the strips and the corners forming the mouths of the slots 60, are so positioned that the wear thereon will be greater than will be the surface of the pipe 11. Therefore, the making of the strips of more durable material will give a screen with marked wear resisting qualities, without great expense, such as would result from making the entire pipe 11 from expensive wear resistant material.

I consider of importance among the features accomplished by my invention, the balance of pressure within the longitudinal channels underneath the strips attained by the entry of fluid into this channel from both sides, as occurs through the side openings 16, and the entry of fluid through the slots 60 when such slots are employed in conjunction with the other features of the screen strips. Also the tendency of fluid entering one of the side slots 16, is to travel toward the slots on the opposite side of the strip, there to perform a washing action functioning to open up these opposite slots should these slots have become clogged, this self clearing action serving to keep the capacity of the screen at its maximum point.

I claim as my invention:

1. In a well screen: a pipe having radial openings therethrough in a selected alignment; and guard strip means on said pipe aligned centrally over said openings, said strip means being held away from the surface of the pipe to provide screen slots the mouths of which are formed between the edges of said strip means and the surface of said pipe.

2. In a well screen; a pipe having inlet openings therethrough in a selected alignment; and guard strip means on said pipe aligned over said openings, said strip means being held away from the surface of the pipe to provide screen slots between the edges of said strip means and the surface of said pipe.

3. A well screen as in claim 2, in which said guard strip means are hollowed on the under face to form an enlarged space between said strip means and the face of said pipe in which fluid may flow.

4. A well screen as in claim 2, in which the space between said guard strip means and the surface of said pipe enlarges as it progresses inwardly from the edges of said strip means toward the center thereof.

5. A well screen as in claim 2, in which the separate extensions of said guard strip means are welded together and to said pipe at intervals.

6. A well screen comprising: a pipe having inlet openings therethrough in a selected alignment; guard strip means on said pipe aligned over said openings; means for holding said guard strip means away from the surface of the pipe to provide screen slots between said guard strip means and said pipe; and metal bodies welded between adjacent edges of separate extensions of said guard strip means and to the exterior of said pipe.

7. A well screen as in claim 6, in which the space between said guard strip means and the surface of said pipe enlarges as it progresses inwardly from the edges of said strip means toward the center thereof.

8. A well screen as in claim 6, in which said guard strip means are equipped with a longitudinal channel on the under face to provide a longitudinal passage of increased size as compared to said screen slots, said passage being between said guard strip means and said pipe and communicating with said openings through said pipe.

9. In a well screen: a pipe having openings therethrough in longitudinal rows; guard strips secured longitudinally on said pipe over said openings, said guard strips being spaced away from the face of said pipe so that slots will be formed between the edges of said strips and said pipe through which fluid may gain access to said openings; and means for holding said guard strips in circumferential arrangement on said pipe.

10. A well screen as in claim 9, in which said guard strips are concave on their under faces whereby the space between said guard strips and said pipe will enlarge to maximum height as it progresses inwardly from its edges toward the center thereof.

11. A well screen as in claim 9, in which said guard strips are secured together and to said pipe by welded lugs spaced at intervals, said lugs being so formed as to form shelves for resisting downward movement of the well structure.

12. In a well screen: plate members placed with openings between their adjacent edges; and a supporting pipe on which said plate members are mounted with inner edges spaced away from the face of said pipe in a manner to form entrance mouths between the said inner edges of said plate members and the surface of said pipe, there being openings through said pipe underneath said plate members through which fluid which has entered said mouths may gain access to the interior of said pipe.

13. In well screen construction: a plate member; and a supporting pipe on which said plate member is mounted with inner edges spaced away from the surface of said pipe in a manner to form entrance mouths between said inner edges of said plate members and the surface of said pipe, there being openings through said pipe underneath said plate member through which fluid after entering said mouths may gain access to the interior of said pipe.

14. In well screen construction: a plate member; and a supporting pipe on which said plate member is mounted, with an inner edge thereof spaced away from the surface of said pipe in a manner to form an entrance mouth between said inner edge and the surface of said pipe; there being an opening through said pipe underneath said plate member through which fluid after entering said mouth may gain access to the interior of said pipe.

15. In a well screen: a pipe having inlet openings in the wall thereof; and plate members on said pipe over said openings, said plate members being held spaced away from the surface of the pipe to provide screen slots having their inlet mouths located between the inner edges of said plate members and the surface of said pipe.

Signed at Los Angeles, in the county of Los Angeles and State of California, this 28th day of February, 1927.

MAHLON E. LAYNE.